United States Patent [19]

Simpson et al.

[11] Patent Number: 4,744,114
[45] Date of Patent: May 17, 1988

[54] CRIB CONSTRUCTION INCLUDING HANGER BRACKET

[75] Inventors: Danny Simpson, Seymour; William S. Suvak, Salem; Steven L. Speck, Seymour, all of Ind.

[73] Assignees: Lear Siegler Seymour Corp., Seymour; Smith Cabinet Mfg. Co., Salem, both of Ind. ; a part interest

[21] Appl. No.: 928,927

[22] Filed: Nov. 7, 1986

[51] Int. Cl.⁴ .............................................. A47D 9/00
[52] U.S. Cl. .......................................... 5/11; 5/93 R;
5/209; 403/254; 403/316
[58] Field of Search ........... 5/11, 93 R, 189, 207–209; 403/254, 255, 316

[56] References Cited

U.S. PATENT DOCUMENTS

| 3,192,596 | 7/1965 | Gruber | 5/11 X |
| 3,537,115 | 11/1970 | Gordin | 5/93 R X |
| 4,148,106 | 4/1979 | Gallien | 403/316 X |
| 4,470,716 | 9/1984 | Welch | 403/316 X |

Primary Examiner—Alexander Grosz
Assistant Examiner—Michael F. Trettel
Attorney, Agent, or Firm—Reising, Ethington, Barnard, Perry & Milton

[57] ABSTRACT

A crib assembly (10) includes a bedstead (12), spring frame (20), and hanger support bracket (30). The hanger support bracket (30) is fixedly secured to the end post (14) of the bedstead (12). The hanger support bracket (30) includes a base portion (32) and a plurality of hooks (34) extending from the base portion (32). A flexible arm (44) extends from the base portion (32) to the hook (34) for releasably retaining a hanger (26) on the hook (34).

28 Claims, 2 Drawing Sheets

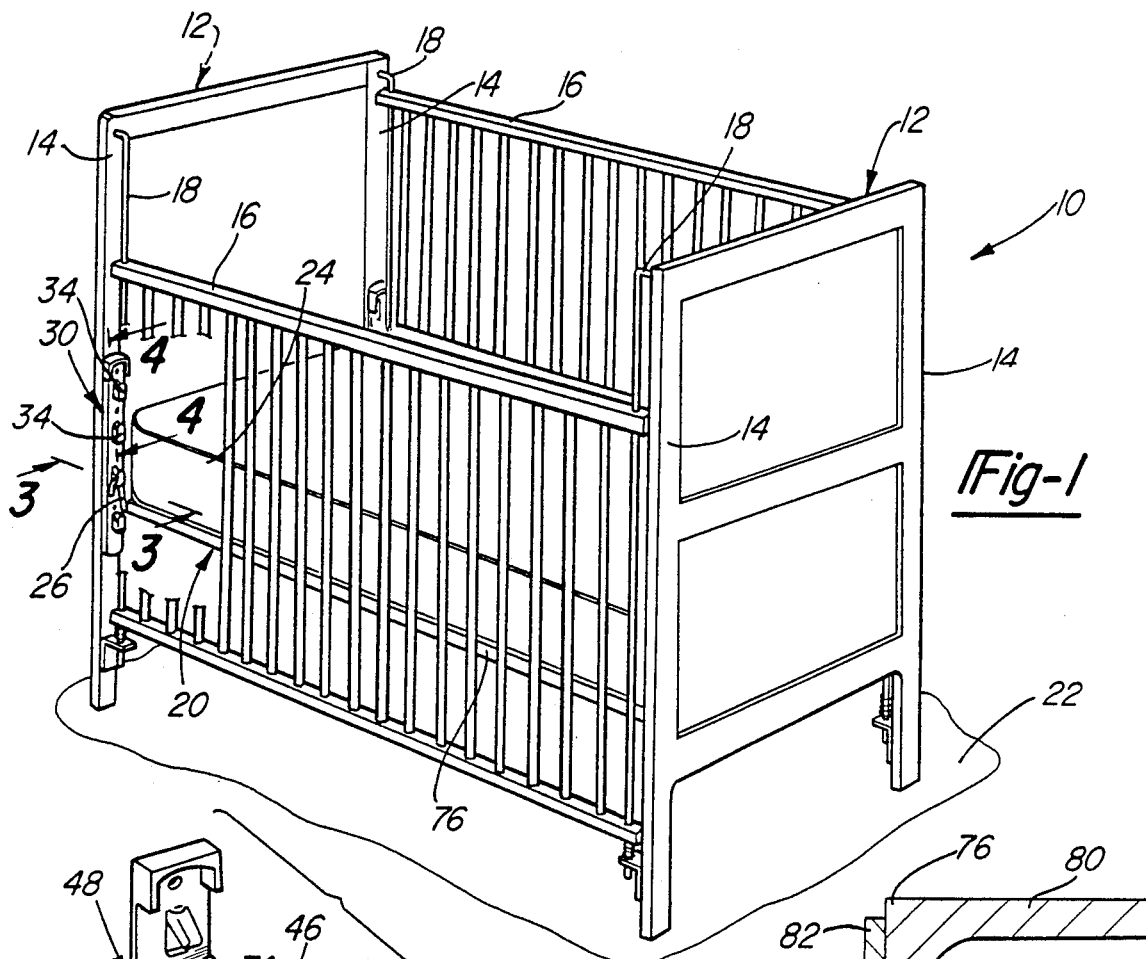
*Fig-1*
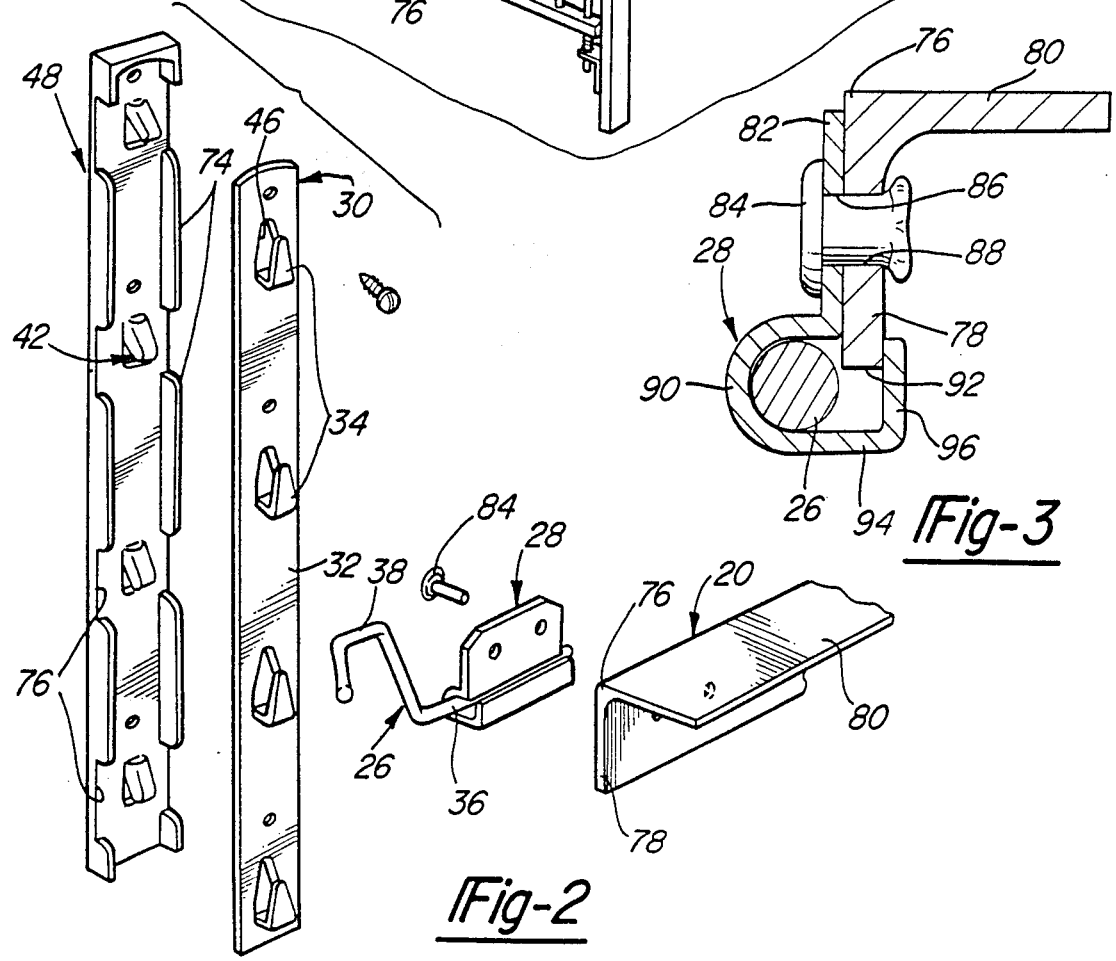
*Fig-2*
*Fig-3*

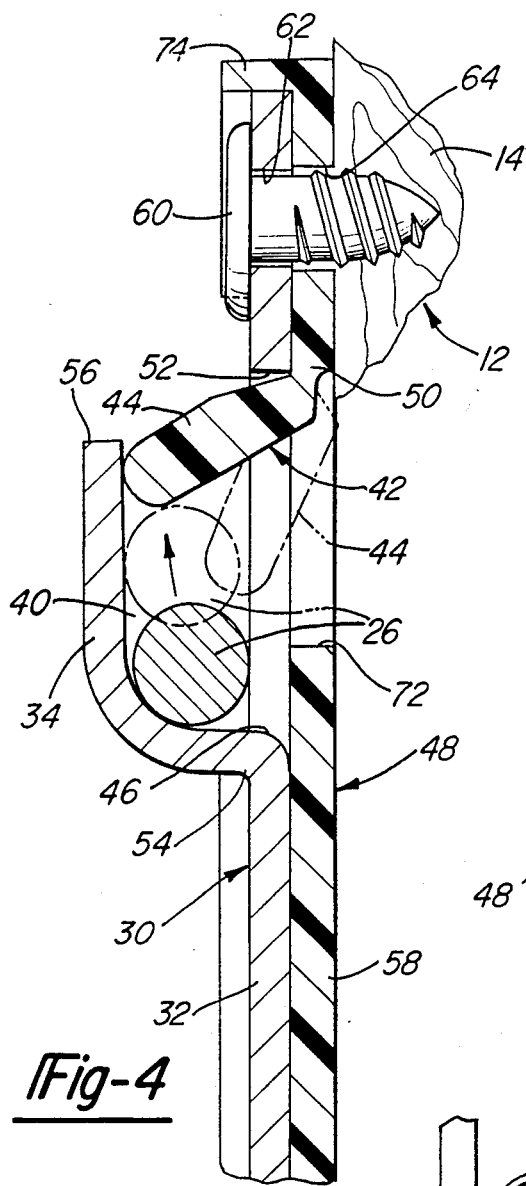
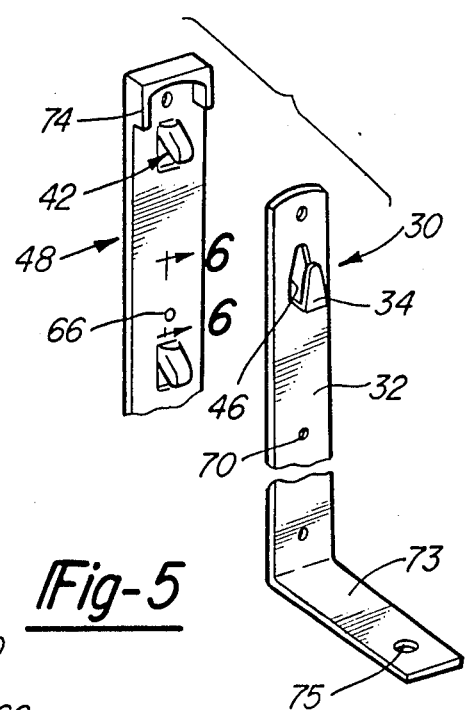
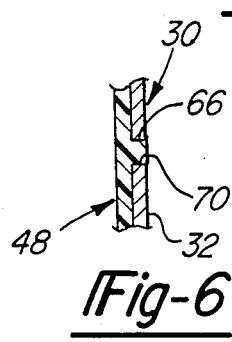
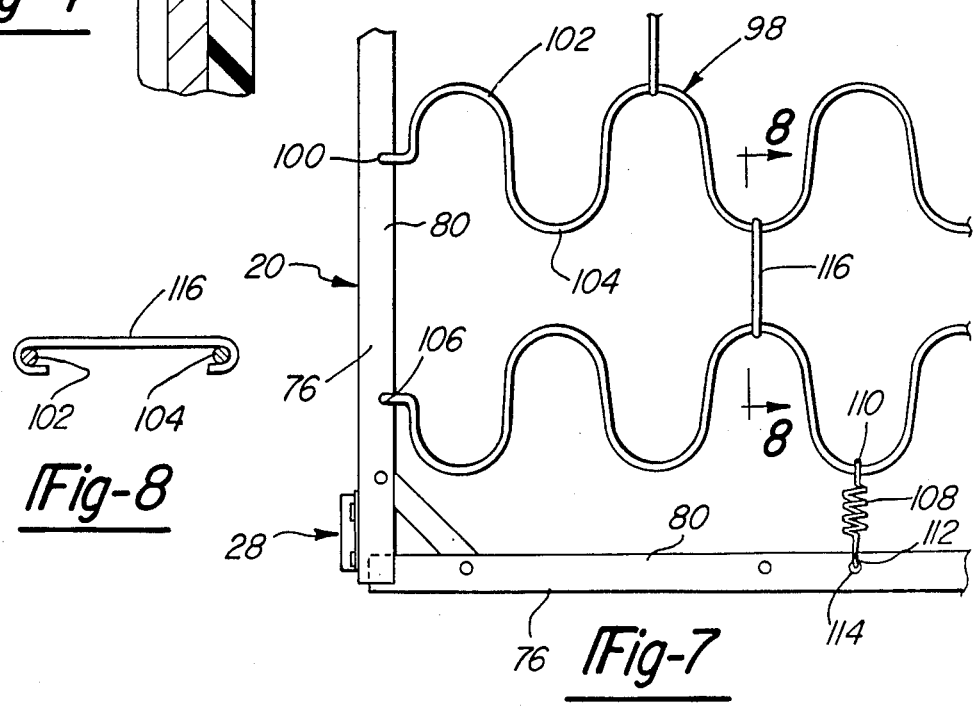

CRIB CONSTRUCTION INCLUDING HANGER BRACKET

TECHNICAL FIELD

The instant invention relates to a bed construction. More particularly, the invention relates to the construction of a crib spring frame and means for supporting the frame from the end posts of a bedstead.

BACKGROUND ART

Baby cribs generally include a bedstead having four end posts defining four corners of the crib assembly. A spring frame for supporting a mattress thereon is supported from the end posts.

The prior art includes a multitude of spring assemblies suspended from spring frames. For exampled, the U.S. Pat. No. 2,908,918 to Hopkes, issued Oct. 20, 1959, discloses a bed frame supporting a plurality of springs which are sinuous springs having ends connected directly to the bed frame. Such spring arrangements are constructed to provide maximum support for a mattress. Other considerations to the manufacturer, such as cost of materials come into play whereby simplicity in the spring construction is desirable. The present invention provides a spring frame of simple construction including sinuous springs connected to the bed frame in a novel manner. The minimizing of parts results in a decreased cost of the assembly without any loss of performance characteristics.

Most baby cribs on the market today include spring frames which can be adjusted to various heights relative to the bedstead. The cribs include brackets for adjustably supporting the spring frame, such as those disclosed in the U.S. Pat. Nos. 2,297,963 to Krol et al, issued Oct. 6, 1942; 2,311,892 to Uline, issued Feb. 23, 1943; and 3,760,434 to Neunherz et al, issued Sept. 25, 1973. As disclosed in the Neunherz et al patent, means have recently been provided for positively retaining the hanger connected to the spring frame on the hook. The Neunherz et al patent specifically discloses a bracket including hooks that are directed toward the bed posts so that the hangers snap into the hooks. Such hooks do not retain the hangers therewithin when subjected to the forces required by new safety laws. For example, industry standards to be enacted requires that the means retaining the hangers on the hooks be effective to at least 25 pounds of force. Much less force is required to remove the hangers from hooks such as those disclosed in the Neunherz et al patent. The present invention provides means for releasably retaining the hangers on the hooks which would stand forces greater than 25 pounds.

The invention is further specifically directed to the hanger brackets which connect the hangers directly to the bed frame. Such hanger brackets generally include a flat portion directly connected to the bed frame and a substantially C-shaped portion having an open end for containing the hanger against the vertical portion of an angle iron bed frame. An example of a hanger bracket is disclosed in the U.S. Pat. No. 3,883,905 to Bryant, issued May 20, 1975. The Bryant patent discloses a clip-on hanger bracket having a first portion clipping onto the horizontal portion of the hanger bracket and a second portion gripping the bottom portion of the hanger bracket. However, if substantial force is applied to the spring frame, there remains the possibility of the bracket opening and the hanger dropping out of the hanger bracket. The present invention provides a hanger bracket which contains a hanger therein even when substantial force is applied to the bed frame.

STATEMENT OF THE INVENTION

In accordance with the present invention, there is provided a crib including a bedstead having end post means at each corner for supporting a spring frame above a floor. Spring frame means supports a mattress thereon and includes four corners and hangers connected to the spring frame means. Hanger support means are fixedly secured to each of the end post means for supporting each of the hangers at a position on the end posts means. Each of the hanger support means includes a base portion and at least one hook extending from the base portion and defining a hanger receiving space between the hook and the base portion. The invention is characterized by releasable hanger retaining means extending from the base portion towards the hook and over the hanger receiving space for releasably retaining the hanger on the hook and within the hanger receiving space.

FIGURES IN THE DRAWINGS

An embodiment of a baby crib constructed in accordance with the present invention will now be described by way of example only, with reference to the accompanying drawings, in which:

FIG. 1 is a perspective view of a baby crib constructed in accordance with the present invention;

FIG. 2 is an exploded view of the hanger support means and hanger support bracket of the present invention;

FIG. 3 is a cross sectional view of the hanger bracket constructed in accordance with the present invention;

FIG. 4 is an enlarged cross sectional view of the hanger support means;

FIG. 5 is a exploded view of a second embodiment of the hanger support means;

FIG. 6 is a cross sectional view taken substantially along line 6—6 of FIG. 5; and FIG. 7 is a plan fragmentary view of the spring frame means constructed in accordance with the present invention; and FIG. 8 is a side view partially in cross section taken substantially along line 8—8 of FIG. 7.

DETAILED DESCRIPTION OF THE DRAWINGS

A crib assembly constructed in accordance with the present invention is generally shown at 10 in FIG. 1.

The crib 10 includes a pair of bedsteads or headboards generally indicated at 12. The bedstead 12 includes end posts or corner posts 14 at each corner. As illustrated in FIG. 1, the end posts 14 are an integral portion of the bedstead 12. Other constructions can also be found where the corner posts are independent members. Side rails 16 are supported by rods 18 for vertical movement.

A spring frame, generally indicated at 20 is supported from the end posts 14 above the level of the floor 22. The spring frame 20 supports a mattress 24 thereon. The spring frame 20 includes four corners and hangers 26 connected at the four corners. The hangers 26 are pivotally connected to the spring frame 20 by hanger brackets generally indicated at 28, the structure of which will be discussed in greater detail below.

The assembly 10 includes hanger support means generally indicated at 30 fixedly secured to each of the end posts 14 for supporting each of the hangers 26 at a position on the end posts 14. Each of the hanger support means 30 generally includes a base portion 32 and plurality of hooks 34 extending from the base portion 32 for retaining the hangers 26 at various heights relative to floor 22.

Each of the hangers 26 include an elongated portion 36 retained in the hanger bracket 28 and a hook shaped portion 38 releasably retained in any one of the hooks 34. Each of the hooks 34 defines a hanger receiving space 40, as indicated in FIG. 4, between the inner surface 34 and adjacent base portion 32.

Releasable hanger retaining means generally indicated at 42, extends from the base portion 32 towards the hook 34 and over the hanger receiving space 40 for releasably retaining the hanger 26 on the hook 34 within the hanger receiving space 26.

More specifically, the hanger retaining means 42 includes an arm portion 44 having a neutral position as shown in FIG. 3 extending from the base portion 32 to the hook 34 and over the hanger receiving space 40. The arm 44 is pivotally connected relative to the base portion 32 by biasing means for allowing the arm 44 to passively move from the neutral position into the hanger receiving space 40, as shown in phantom in FIG. 4, to allow insertion of the hanger 26 into the space 40. In other words, the hanger 26 can be forced past the arm 44, deflecting the arm 44 to thereby allow the hanger into the space 40.

The biasing means biases the arm 44 back to the neutral position. The biasing means will be described in greater detail below.

The hanger retaining means 42 includes abutment means for abutting against the arm 44 when the arm 44 is in the neutral position and preventing the arm 44 from pivoting away from the base portion 32 beyond the neutral position. The abutment means prevents the hanger 26 from displacing the arm 44 outwardly from the neutral position and inadvertently releasing the hanger 26 under the applications of forces at least up to 25 pounds. More specifically, the hanger support means 30 includes a hook bracket 30 including the base portion 32 and the hooks 34 extending away from the base portion 32. There are openings 46 through the base portion 32 opposite the hooks 34. The assembly 10 includes a separate biasing arm bracket generally indicated at 48 including a plurality of the arms 44 extending therefrom. The brackets 30 and 48 are fitted together so that each of the arms 44 extends through an opening 46 and over the hanger receiving space 40 in the neutral position.

The biasing arm bracket 48 is made from a flexible yet durable plastic material. The arm 44 is integrally connected to the biasing arm bracket 48 by a connecting portion 50 having a decreased thickness in cross section as shown in FIG. 3. This connecting portion 50 provides pivotal connecting means for connecting the arm 44 to the biasing arm bracket 48 and providing pivoting movement of the arm 44 into the opening 46 in the base portion 32 of the hook bracket 30 to allow the hanger 26 to pass into the hanger receiving space 40 of the hook 34. The connecting portion 50 further provides biasing means, as the material is resilient, for returning the arm 44 to the neutral position once the hanger is forced passed the arm 44 into the hanger receiving space 40.

The abutment means referred to above includes an abutment surface 52 defining an upper limit of the opening 46. The biasing arm bracket 48 is connected to the hook bracket 32 in such a way that the arm 44 engages the abutment surface 52 when the arm 44 is in the neutral position. The abutment surface 52 thereby limits the upward movement of the arm 44. Accordingly, force applied against the arm 44 by the hanger 26 is generally incapable of moving the arm 44 except under high force loads. In this manner, the arm 44 positively retains the hanger 26 within the hanger receiving space. The hanger 26 may be removed by downward depression of the arm 44 from the neutral position and then lifting of the hanger out of the hanger receiving space 40 in the direction of the arrow indicated in FIG. 3.

Referring to FIG. 4, each hook 34 has an origin 54 adjacent the base portion 32 and a distal end portion 56. The arm 44 is inclined at an acute angle relative to the vertical extent of the base portion 32 when in the neutral position and extends to a position adjacent the hook 34 between the origin 54 and the end portion 56. The arm 44 thereby acts as a pocket to receive the upwardly deflected hook 26 and capture it in the strongest part of the arm 44 adjacent its origin and against the abutment means 52.

Preferably, when the arm 44 is in the neutral position, the end of the arm 44 is closer to the end portion 56 of the hook thereby providing for sufficient space for the retention of the hanger 26 within the hanger receiving space 40. The length of the arm 44 is such that when the hanger 26 is seated in the hanger receiving space 40 the arm 44 can be depressed to the position shown in hatch lines in FIG. 3 and allow the hanger 26 to pass upwardly and out from the hook 34. In other words, the arm 44 must be long enough to prevent the hanger 26 from inadvertently coming out of the hanger retaining space 40 by extending over the space 40 yet be short enough to pass the hanger 26 within the hanger receiving space and allow the hanger 26 to be removed therefrom.

The biasing arm bracket 48 includes a body portion 58. Each of the arms 44 extends away from the body portion 58. Upon being mounted on the crib 10, the base portion 32 of the hanger bracket 30 is mounted against the body portion 58 of the biasing arm bracket 48. This is accomplished by a plurality of fastening screws 60 being disposed through holes 62 in the hanger bracket 30 and aligned holes 64 in the biasing arm bracket 48. The screws can be driven directly into the end posts 14 of the bedstead 12. Of course, other means may be used to secure the brackets 30 and 48 to the crib. The hanger bracket 30 can be retained directly on the biasing arm bracket 48 independent of the fastening screw 60 as detailed in FIG. 6. Projections 66 extend from the biasing arm bracket 48. These projections 66 can be inserted through openings 70 in the hanger bracket 30 whereby the head portion 68 retains the projection 66 is interference fit within the opening 70. Several of these fastening means can be located along the length of the brackets 30 and 48 to provide means for securing the brackets 30 and 48 together independent of the fastening screws 60.

Referring again to FIG. 4, the body portion 58 of the biasing arm bracket 48 includes a plurality of holes 72 extending therethrough below each of the arms 44 and within the acute angle defined by the arm 44 and body portion 58. The portion 50 of the arm 44 having the decreased cross section and providing the connecting means to the body portion 58 provides for the arms 44 to pivot into the holes 72 and allow the hangers 26 to pass into and out of the hanger receiving spaces 40. These holes 72 are necessary due to the proximity of the brackets 30 and 48.

The base portion 32 of the hanger brackets 30 is elongated and extends vertically along the bed posts 14 as shown in FIG. 1. The abutment surfaces 52 are spaced vertically above the end portions 56 of each hook 34, as shown in detail in FIG. 3. Each arm 44 extends vertically downwardly from the body portion 58 of the biasing arm bracket 48 and adjacent the abutment surface 52 to a point below and adjacent to the end portion 56 of the hook 34. This specific positioning and orientation of the abutment surface 52, arm 44, and end portion 56 of the hook 54 provides that both the abutment surface 52 and end portion 56 of the hook 34 contribute to preventing outward flexture of the arm 44 beyond the neutral position. The abutment surface 52 engages the arm 44 in the neutral position. Outward pressure by a hanger rod 26 against the arm 44 forces the end of the arm 44 against an inner surface of the hook 34 below the end portion 56. Hence, both the abutment surface 52 and inner surface of the hook 34 below the end portion 56 contribute to preventing inadvertent dislodgement of the arm 44 by the hanger 26.

The assembly includes alignment means for aligning the hanger bracket 30 against the biasing arm bracket 48. The projections 66, having the enlarged heads 68 contribute to alignment of the brackets 30 and 48. Further, the alignment means includes a plurality of flanges 74 extending about the periphery of the body portion 58 of the biasing arm bracket 48. The base portion 32 of the hanger bracket 30 is seated within the confines of the flanges 74. The flanges 74 define vertical spaces 76 between each flange 74, the vertical spaces 76 being aligned vertically with the hanger retaining spaces 40 to allow the hangers 26 to be seated against the base portion 32 of the hanger bracket 30, as shown in the enlarged detail in FIG. 3. Absent the spaces 76, the hanger 26 would lodge against the flanges 74 thereby requiring further extension of the hook 34 away from the body portion 32 of the hanger bracket 30. The spaces 76 allow the hangers 26 to be seated within the hanger receiving spaces 40 of the hooks 34 and against the body portion 32 of the hanger bracket 30.

The flanges 74 further provide means for covering the exposed edges of the base portion 32. The flanges 74 thereby inhibit access to the corners of the hook bracket 30.

In the preferred embodiment, the hanger bracket 30 is made from a metal sufficiently rigid to support the hanger 26 and bed frame, mattress, and infant thereon. The bracket 30 is L-shaped having a horizontal portion 73. The horizontal portion 73 includes an opening 75. The rod 18 extends through the opening 75 and is supported thereby.

As briefly mentioned above, the assembly 10 includes hanger mounting means 28 secured to the four corners of the spring frame 20 for mounting the hangers 26 for pivoting movement relative to the spring frame 20. More specifically, the spring frame 20 includes four angle irons 76. Each of the angle irons 76 has a vertical portion 78 and a horizontal portion 80, as shown in FIGS. 2 and 4. The hanger mounting means includes a hanger bracket 28 connected to each of the four corners of the bed frame 20. The hanger bracket 28 includes a flat portion 82 fixedly secured to the vertical portion 78 of the angle iron 76 by a fastener 84. The fastener 84 is disposed through an opening 86 in the flat portion 82 of the bracket 28 and through an opening 88 in the vertical portion 78 of the angle iron 76. In this manner, the hanger bracket 28 is fixedly secured to the vertical portion 78 of the angle iron 76 and defines a plane parallel to and spaced adjacent to the vertical portion 78. The hanger bracket 28 further includes a substantially C-shaped portion 90 for containing the hanger 26 therein.

The vertical portion 78 of the angle iron 76 has a lower edge 92, as indicated in FIG. 3. The C-shaped portion 90 has an upper extent integral with the flat portion 82. The C-shaped portion further has a lower extent. The hanger bracket 28 includes an L-shaped portion having a horizontal leg 94 and a vertical 96. The horizontal leg is integral with and extends from the lower extent of the C-shaped portion 90 and below the flat portion 82 beyond the plane defined by the flat portion 82. The vertical leg 96 is parallel relative to the above-defined plane and extends upwardly from the horizontal leg 94. The vertical portion 78 of the angle iron 76 extends downwardly and is seated against vertical leg 96 whereby the L-shaped portion grips the vertical portion 78 of the angle iron 76. The L-shaped portion further completely contains the hanger 26 therein. Accordingly, weight can be placed on the mattress 24 and yet the hanger 26 is contained within the confines of the hanger bracket 28. Unlike prior art assemblies which can include hanger brackets that did not fully enclose the hangers, the present invention provides a hanger bracket which encloses the hanger thereby providing a safer hanger bracket.

The assembly 10 includes springs supported by the spring frame 20 for dissipating localized energy or impart throughout the frame. The springs include a plurality of sinuous strips generally indicated at 98 in FIG. 7, each of the strips 98 having two ends 100 of identical shape (only one of the ends being shown in FIG. 7). The assembly 10 includes attachment means for attaching the ends 100 of the springs 98 to the frame 20.

More particularly, each of the sinuous strips 98 is flat and parallel to each other strip 98. Each of the sinuous strips 98 includes a longitudinal midline and intermediate alternating left and right hand convolutions 102 and 104 respectively extending to an equal extent on opposite sides of the midline. The sinuous strips 98 are symmetric curving wire spring members.

The horizontal portions 80 of the angle irons 76 have holes 106 therethrough. The attachment means includes bent ends of the sinuous strips 98 which are bent at substantially right angles relative to the longitudinal extent of the sinuous strips 98 and extend through the holes 106. The ends 100 of the strips 98 engage the angle irons 76 through the holes 106.

The attachment means further include a plurality of helical springs 108, each of the helical springs having a first end 110 secured to one of the convolutions of a sinuous spring adjacent to the angle iron 76 and a second end 112 secured to holes 114 in the horizontal portion 80 of the angle iron 76.

Interspring connecting means connects adjacent sinuous springs 98 together. The interspring connecting means includes a plurality of C-shaped clips 116, as shown in FIG. 8, each of the clips 116 having one curved arm engaging a convolution of one of the sinuous springs 98 and a second curved arm engaging one of the convolutions of an adjacent one of the sinuous springs 98.

In combination, the helical springs 108 and C-shaped clips 106 interconnect the sinuous springs 98 into an integral spring unit. The helical springs 108 are not as rigid as the strips 98. The helical springs 108 increases travel of the spring unit in the direction perpendicular to the length of the strips 98 and the force away from the frame angle rims. The clips 116 dissipate the load exerted on one strip 98 to the remaining strips 98 and the remainder of the spring unit. Additional hooks rigidify the unit while a decreased number of hooks increase deflection of the unit. Unlike prior art spring frames requiring additional sinuous springs or other arrangements, the instant invention provides a simple yet effective means for securely and firmly supporting a mattress and child thereon.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A crib assembly (10) comprising: a bedstead (12) including end post means (14) at each corner for supporting a spring frame (20) above a floor (22); spring frame means (20) for supporting a mattress (24) thereon; and hangers (26) connected to said spring frame means (60); and hanger support means (30) fixedly secured to each of said end post means (14) for supporting each of said hangers (26) at a position on said end post means (14), said hanger support means (30) including a base portion (32) and at least one hook (34) extending from said base portion (32) and defining a hanger receiving space (40) between said hook (34) and said base portion (32); and releasable hanger retaining means (42) extending from said base portion (32) towards said hook (34) and over said hanger receiving space (40) for releasably retaining said hangers (26) on said hook (34) and within said hanger receiving space (26); said hanger retaining means (42) including an arm portion (44) having a neutral position wherein said arm (44) extends from said base portion (32) to said hook (34) and over said hanger receiving space, said arm (44) being pivotally connected relative to said base portion (32) for being forced into said hanger receiving space (40) during insertion of a hanger (26) into said space (40), said hanger retaining means (42) further including biasing means for biasing said arm (44) back towards said neutral position, said assembly (10) including abutment means for abutting against said arm (44) when said arm (44) is in said neutral position and preventing said arm (44) from pivoting away from said base portion (32) beyond said neutral position.

2. An assembly as set forth in claim 1 further characterized by said hanger support means (30) which includes a hook bracket (30) including said base portion and at least one of said hooks (34) extending away from said base portion (32), said hook bracket (30) including an opening (46) through said base portion (32) opposite said hook (34), said assembly (10) further including a biasing arm bracket (48) have at least one of said arms (44) extending therefrom and through said opening (46) and over said hanger receiving space (40) when said arm (44) in said neutral position.

3. An assembly as set forth in claim 2 further characterized by said biasing arm bracket (48) including pivotal connecting means for connecting said arm (44) to said biasing arm bracket (48) and providing pivoting movement of said arm (44) into said opening (46) to allow said hanger (26) to pass into said hanger receiving space (40).

4. An assembly as set forth in claim 3 further characterized by said biasing arm bracket (48) including a body portion (58) and said arms (44) being integral with said body portion (58) and having an origin (50) adjacent said body portion (58), said connecting means including a flexible portion (50) of reduced cross section relative to said body portion (58) and said arm (44).

5. An assembly as set forth in claim 3 further characterized by said base portion (32) including an abutment surface (52) defining an upper limit of said opening (46) through said base portion (32), said abutment means including said abutment surface (52).

6. An assembly as set forth in claim 5 further characterized by including said hook (34) having an origin (54) at said base portion (32) and an end portion (56), said arm (44) extending from said biasing arm bracket (48) at an acute angle to a position adjacent said hook (34) and between said origin (54) and end portion (56).

7. An assembly as set forth in claim 6 further characterized by said biasing arm bracket (48) including a body portion (58), said arm (44) extending away from said body portion (58), said base portion (32) of said hanger bracket (30) being mounted against said body portion (58) of said biasing arm bracket (48).

8. An assembly as set forth in claim 7 further characterized by said body portion (58) including holes (72) extending therethrough below each of said arms (44) within said acute angles, said connecting means providing for said arms (44) to pivot into said holes (72) to allow said hangers (26) to pass into said hanger receiving spaces (40).

9. An assembly as set forth in claim 8 further characterized by said base portion (32) being elongated and extending vertically along said bed post means (14), said abutment surfaces (52) being spaced vertically above said end portion (56) of said hook (34), said arm (44) extending vertically downwardly from said body portion (58) and adjacent said abutment surface (52) to a point below and adjacent said end portion (56) of said hook (34).

10. An assembly as set forth in claim 9 further characterized by including alignment means for aligning said hanger bracket (30) against said biasing arm bracket (48).

11. An assembly as set forth in claim 10 further characterized by said body portion (58) including a periphery, said alignment means including a flange (74) extending about the periphery of said body portion (58), said base portion (32) being seated within the confines of said flange (74).

12. An assembly as set forth in claim 11 further characterized by said alignment means including a plurality of flanges (74) extending about the periphery of said body portion (58) and defining vertical spaces (76) between the end of each flanges (74), said vertical spaces (76) being aligned horizontally with said hanger retaining spaces (40) to allow said hangers (26) to be seated against said base portion (32).

13. An assembly as set forth in claim 12 further characterized by including securing means for securing said base portion (32) to said body portion (58).

14. An assembly as set forth in claim 13 further characterized by said securing means including ports (70) extending through said base portion (32) and projections (66) extending from said body portion (58) for mating engagement with said ports (70), said projections (66) including an elongated portion (66) extending through said ports (70) and an expanded head portion (68) beyond said ports (70) for abutting against said body portion (32) to retain said elongated portion (66) within said port (70).

15. A hanger support (30) for supporting a hanger (26) from a bed post (14) of a crib (10), said hanger support (30) comprising: a base portion (32); at least one hook (34) extending from said base portion (32) and defining a hanger receiving space (40) between said hook (34) and said base portion (32); and releasable hanger retaining means (42) extending from said base portion (32) towards said hook (34) and over said hanger receiving space (40) for releasably retaining a hanger (26) on said hook (34) and within said hanger receiving space (40), said hanger retaining means (42) including an arm portion (44) having a neutral position wherein said arm (44) extends from said base portion (32) to said hook (34) and over said hanger receiving space (40), said arm (44) being pivotally connected relative to said base portion (32) for moving into said hanger receiving space (40) to allow insertion of a hanger (26) into said space (40), said hanger retaining means (42) further including biasing means for biasing said arm (44) back towards said neutral position, said assembly (10) including abutment means for abutting against said arm (44) when said arm (44) is in said neutral position and preventing said arm (44) from pivoting away from said base portion (32) beyond said neutral position.

16. An assembly as set forth in claim 15 further characterized by including a hook bracket (30) including said base portion (32) and at least one of said hooks (34) extending away from said base portion (32) and having an opening (46) through said base portion (32) opposite said hook (34) and a biasing arm bracket (48) including at least one of said arms (44) extending therefrom and through said opening (46) and over said hanger receiving space (40) when said arm (44) is in said neutral position.

17. An assembly as set forth in claim 16 further characterized by said biasing arm brackets (48) including pivotal connecting means for connecting said arm (44) to said biasing arm bracket (48) and providing pivoting movement of said arm (44) into said opening (46) to allow a hanger (26) to pass into said hanger receiving space (40).

18. An assembly as set forth in claim 17 further characterized by said base portion (32) including an abutment surface (52) defining an upper limit of said opening (46) through said base portion (32), said abutment means including said abutment surface (52).

19. An assembly as set forth in claim 18 further characterized by said hook (34) having an origin (54) at said base portion (32) and an end portion (56), said arm (44) extending from said biasing arm bracket (48) at an acute angle to a position adjacent said hook (34) between said origin (54) and end portion (56).

20. An assembly as set forth in claim 19 further characterized by said biasing arm bracket (48) including a body portion (58), said arm (44) extending away from said body portion (58), said base portion (32) of said hanger bracket (30) being mounted against said body portion (58) of said biasing arm bracket (48).

21. An assembly as set forth in claim 20 further characterized by said body portion (58) including holes (72) extending therethrough below each of said arms (44) within said acute angles, said connecting means providing for said arms (44) to pivot into said holes (72) to allow said hangers (26) to pass into said hanger receiving spaces (40).

22. An assembly as set forth in claim 21 further characterized by said base portion (32) being elongated along a vertical extent, said abutment surface (52) being spaced vertically above said end portion (56) of said hook (34), said arm (44) extending vertically downwardly from said body portion (58) and adjacent said abutment surface (52) to a point below and adjacent to said end portion (56).

23. An assembly as set forth in claim 22 further characterized by including alignment means for aligning said hanger bracket (30) against said biasing arm bracket (48).

24. An assembly as set forth in claim 23 further characterized by said body portion (58) including a periphery, said alignment means including a flange (74) extending about the periphery of said body portion (58), said base portion (32) being seating within the confines of said flange (74).

25. An assembly as set forth in claim 24 further characterized by said alignment means including a plurality of flanges (74) extending about the periphery of said body portion (58) and defining vertical spaces (76) between the end of each flange (74), said vertical spaces (76) being aligned horizontally with the hanger retaining spaces (40) to allow the hangers (26) to be seated against said base portion (32).

26. An assembly as set forth in claim 25 further characterized by including securing means for securing said base portion (32) to said body portion (58).

27. An assembly as set forth in claim 26 further characterized by said securing means including ports (70) through said base portion (32) and projections (66) extending from said body portion (58) for mating engagement with said ports (70), said projections (66) including an elongated portion (66) extending through said ports (70) and an expanded head portion (68) beyond said ports (70) for abutting against said body portion (32) to retain said elongated portion (66) within said port (70).

28. An assembly as set forth in claim 27 further characterized by said biasing arm bracket (48) including a body portion (58) and said arms (44) being integral with said body portion (58) and having an origin (50) adjacent said body portion (58), said connecting means including a flexible portion (50) of reduced cross section relative to said body portion (58) and said arm (44).

* * * * *